(12) United States Patent
Yang et al.

(10) Patent No.: US 8,449,163 B2
(45) Date of Patent: May 28, 2013

(54) BACKLIGHT MODULE

(75) Inventors: Chiao-Chih Yang, Hsin-Chu (TW);
Lei-Ken Hung, Hsin-Chu (TW);
Hsin-Tse Tsai, Hsin-Chu (TW); Yi-Yu Tsai, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 183 days.

(21) Appl. No.: 12/881,189

(22) Filed: Sep. 14, 2010

(65) Prior Publication Data

US 2011/0063875 A1 Mar. 17, 2011

(30) Foreign Application Priority Data

Sep. 15, 2009 (TW) ................................ 98131094 A

(51) Int. Cl.
*F21V 7/04* (2006.01)

(52) U.S. Cl.
USPC .......................................... 362/607; 362/621

(58) Field of Classification Search
USPC ................. 362/608, 609, 610, 615, 616, 621, 362/622, 629, 612, 26, 27, 559, 560, 561
See application file for complete search history.

(56) References Cited

U.S. PATENT DOCUMENTS

| | | | |
|---|---|---|---|
| 6,481,130 B1 * | 11/2002 | Wu ................................ | 40/546 |
| 6,906,863 B2 * | 6/2005 | Yoshida et al. ............... | 359/584 |
| 7,628,527 B2 * | 12/2009 | Kim et al. ..................... | 362/621 |
| 7,969,531 B1 * | 6/2011 | Li et al. ........................... | 349/65 |
| 2008/0055928 A1 * | 3/2008 | Arai .............................. | 362/609 |
| 2008/0137374 A1 | 6/2008 | Kim et al. | |
| 2008/0225203 A1 | 9/2008 | Kim | |
| 2008/0231772 A1 * | 9/2008 | Hung ............................. | 349/65 |
| 2008/0291694 A1 * | 11/2008 | Sakai et al. ................... | 362/616 |

FOREIGN PATENT DOCUMENTS

| | | |
|---|---|---|
| CN | 101122711 | 2/2008 |
| TW | 200839378 | 10/2008 |
| TW | 200909938 | 3/2009 |
| TW | 200933086 | 8/2009 |

OTHER PUBLICATIONS

"Office Action of Taiwan counterpart application with English translation" issued on Nov. 14, 2012, p. 1-p. 16.

* cited by examiner

*Primary Examiner* — Julie Shallenberger
(74) *Attorney, Agent, or Firm* — Jianq Chyun IP Office

(57) ABSTRACT

A backlight module includes at least one light emitting device capable of emitting a light beam, a light guide plate, and a thermal insulation light guide element. The light guide plate has two surfaces opposite to each other and a side surface connecting the two surfaces. The light emitting device is disposed beside the side surface. The light beam enters the light guide plate through the side surface. The thermal insulation light guide element has a light incident surface and a light emitting surface. The light incident surface having at least one first recess is located in a transmission path of the light beam and between the light emitting device and the side surface. The light emitting surface is disposed between the light incident surface and the side surface. The glass transition temperature of the thermal insulation light guide element is higher than that of the light guide plate.

18 Claims, 8 Drawing Sheets

BACKLIGHT MODULE

CROSS-REFERENCE TO RELATED APPLICATION

This application claims the priority benefit of Taiwan application serial no. 98131094, filed on Sep. 15, 2009. The entirety of the above-mentioned patent application is hereby incorporated by reference herein and made a part of specification.

BACKGROUND OF THE INVENTION

1. Field of the Invention

The invention relates to a backlight module, and more particularly, to a backlight module having a thermal insulation light guide element.

2. Description of Related Art

In a conventional side type backlight module, a light emitting diode (LED) is required to be placed closely to a light guide plate, such that light beam emitted by the LED may be effectively guided into the light guide plate. However, about 70% heat is produced when the LED is turned on, such that temperature at an edge of the light guide plate near the LED rises above a glass transition temperature of the light guide plate due to the heat. As a result, the light guide plate is warped because of the increasing temperature difference between the temperature at the central region and the temperature at the edge of the light guide plate. And as the size of the backlight module becomes larger and the light guide plate gets thinner, the wrap due to unevenly heating becomes more and more obvious. On the other hand, as limited by white light packaging technique, non-uniformity of brightness and color in the backlight module occurs when a white LED and a square lamp cover are employed together. Besides, the conventional square lamp cover may not control the light emission distribution of an LED.

Furthermore, U.S. Patent Application Publication No. 20080291694 discloses a backlight module including a point light source, a first light guide plate, and a second light guide plate. The second light guide plate takes the shape of a plane and is disposed between the point light source and the first light guide plate. A material of the second light guide plate is polycarbonate (PC). Moreover, US Patent Application Publication No. 20080225203 also discloses a backlight module including an LED light source, an optical reflecting material, and a light guide plate. The optical reflecting material is disposed on an upper portion of a space between the LED light source and the light guide plate, such that light leakage through the upper portion of the space is prevented.

SUMMARY OF THE INVENTION

The invention provides a backlight module. The backlight module has a high reliability and is capable of providing a surface light source with uniform brightness and color.

An embodiment of the invention provides a backlight module including at least one light emitting device, a light guide plate, and a thermal insulation light guide element. The light emitting device is capable of emitting a light beam. The light guide plate has a first surface, a second surface opposite to the first surface, and a side surface connecting the first surface and the second surface. The light emitting device is disposed beside the side surface and the light beam is capable of entering the light guide plate through the side surface. Besides, the thermal insulation light guide element has a light incident surface and a light emitting surface. The light incident surface is located in a transmission path of the light beam and is located between the light emitting device and the side surface. The light incident surface has at least one first recess. The light emitting surface is located in the transmission path of the light beam and is located between the light incident surface and the side surface. Furthermore, a glass transition temperature of the thermal insulation light guide element is higher than a glass transition temperature of the light guide plate.

Another embodiment of the invention provides a backlight module including at least one light emitting device, a light guide plate, and a thermal insulation light guide element. The light emitting device is capable of emitting a light beam. The light guide plate has a first surface, a second surface opposite to the first surface, and a side surface connecting the first surface and the second surface. The light emitting device is disposed beside the side surface and the light beam is capable of entering the light guide plate through the side surface. Besides, the thermal insulation light guide element has a light incident surface and a light emitting surface. The light incident surface is located in a transmission path of the light beam and is located between the light emitting device and the side surface. The light emitting surface is located in the transmission path of the light beam and is located between the light incident surface and the side surface. The light emitting surface has at least one recess. Furthermore, a glass transition temperature of the thermal insulation light guide element is higher than a glass transition temperature of the light guide plate.

Another embodiment of the invention further provides a backlight module including at least one light emitting device, a light guide plate, and a thermal insulation light guide element. The light emitting device is capable of emitting a light beam. The light guide plate has a first surface, a second surface opposite to the first surface, and a side surface connecting the first surface and the second surface. The light emitting device is disposed beside the side surface. The light beam is capable of entering the light guide plate through the side surface. The thermal insulation light guide element has a light incident surface and a light emitting surface. The light incident surface is located in a transmission path of the light beam and is located between the light emitting device and the side surface. The light emitting surface is located in the transmission path of the light beam and is located between the light incident surface and the side surface. The light emitting surface has at least one protrusion. Furthermore, a glass transition temperature of the thermal insulation light guide element is higher than a glass transition temperature of the light guide plate.

Based on the above, in a backlight module of an embodiment of the invention, a thermal insulation light guide element having a higher glass transition temperature than that of the light guide plate is disposed between a light emitting device and a light guide plate. Hence, heat is insulated against being transmitted from the light emitting device to the light guide plate by the thermal insulation light guide element, such that a warp in the light guide plate is prevented and the reliability of the backlight module is enhanced. Besides, the light emission distribution is able to be adjusted by a specially designed light incident surface or light emitting surface of the thermal insulation light guide element. Thus, the backlight module of the embodiment of the invention not only has a high reliability but also provides a surface light source with uniform brightness and color.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
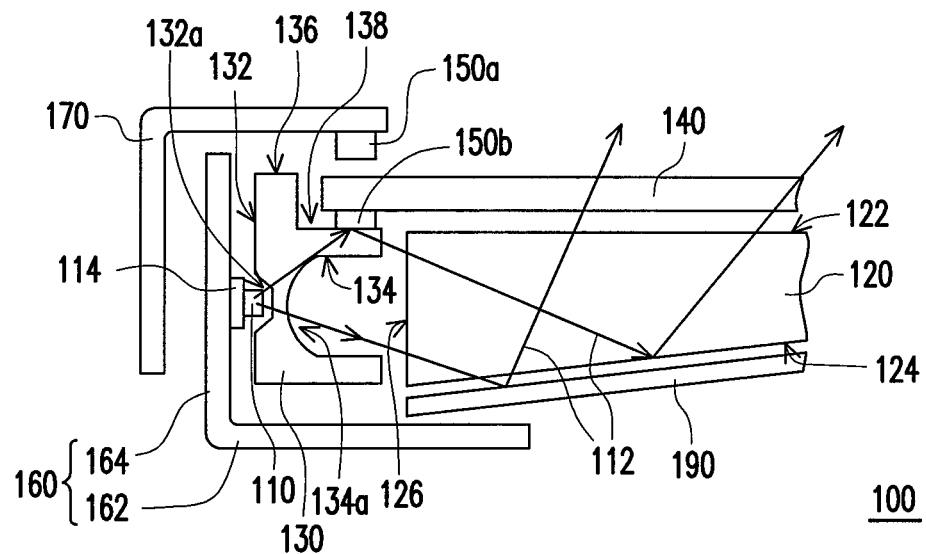
FIG. 1A is a schematic cross-sectional view of a backlight module, a front frame disposed on the backlight module, and a display panel in the first embodiment of the invention.
Figure 1B:
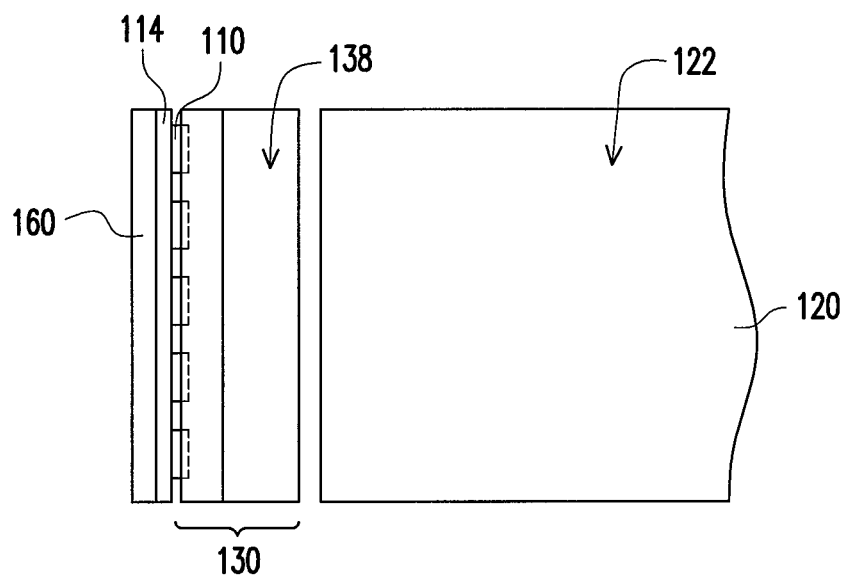
FIG. 1B is a schematic top view of the backlight module in FIG. 1A.

Referring to both FIG. 1A and FIG. 1B, the backlight module 100 includes at least one light emitting device 110 (five light emitting devices 110 are schematically shown in FIG. 1B as an example), a light guide plate 120, and a thermal insulation light guide element 130.

The light emitting device 110 is, e.g., a light emitting diode (LED) capable of emitting a light beam 112. The light guide plate 120 is capable of guiding the light beam 112. The light guide plate 120 has a first surface 122, a second surface 124 opposite to the first surface 122, and a side surface 126 connecting the first surface 122 and the second surface 124. Herein the light emitting device 110 is disposed beside the side surface 126. Specifically, the light beam 112 emitted by the light emitting device 110 enters the light guide plate 120 through the side surface 126. Part of the light beam 112 may be totally reflected several times between the first surface 122 and the second surface 124, and then irradiates on a light diffusion structure (not shown) of the second surface 124 (or the first surface 122). Then, the total reflection is destroyed by the light diffusion structure, such that the light beam 112 is emitted from the first surface 122 or the second surface 124. The light beam 112 emitted from the second surface 124 may be reflected by a reflector 190 under the second surface 124, and then passes through the second surface 124 and the first surface 122 in sequence. As a result, the backlight module 100 is capable of providing a surface light source above the first surface 122.

Referring to FIG. 1A, the thermal insulation light guide element 130 has a light incident surface 132 and a light emitting surface 134. The light incident surface 132 is located in a transmission path of the light beam 112 and is located between the light emitting device 110 and the side surface 126. As shown in FIG. 1A, the light incident surface 132 has at least one first recess 132a, and the light emitting surface 134 has at least one second recess 134a. Besides, the first recess 132a is a polygonal recess, and a cross-sectional view of the first recess 132a is a trapezoid, for example. On the other hand, the second recess 134a forms a curved concave, for example. Furthermore, as shown in FIG. 1A, in the embodiment, at least one part of the light emitting device 110 is located in the first recess 132a. Herein the recess structure is capable of enlarging a light emitting angle of light with a large angle (e.g. 70 degree) of the light beam 112, so that non-uniform brightness at the light incident side of the light guide plate 120 is reduced. Furthermore, the recess structure mentioned above is capable of effectively converging a part of the light beam 112 towards the light guide plate 120, such that the optical efficiency is enhanced.

The glass transition temperature of the thermal insulation light guide element 130 is higher than the glass transition temperature of the light guide plate 120. A material of the thermal insulation light guide element 130 is Arton for example, an amorphous polyolefine manufactured by JSR Ltd. (Japan), or other heat-resistant material such as polycarbonate (PC). Herein the glass transition temperatures of the above materials are about 145° C. On the other hand, a common material of the light guide plate 120 is, for example, polymethyl methacrylate (PMMA), and the glass transition temperature of polymethyl methacrylate is about 95° C. Accordingly, the glass transition temperature of the thermal insulation light guide element 130 is higher than the glass transition temperature of the light guide plate 120 in the embodiment. As a result, the thermal insulation light guide element 130 disposed between the light emitting device 110 and the light guide plate 120 is capable of insulating the heat against being transmitted from the light emitting device 110 to the light guide plate 120, such that a warp in the light guide plate 120 due to unevenly heating is prevented. Thus, the reliability of the backlight module 100 is enhanced. In the embodiment, the light guide plate 120 and the thermal insulation light guide element 130 may be, for example, adhered by glue. Besides, in another embodiment, a gap may be kept between the light guide plate 120 and the thermal insulation light guide element 130, such that the heat-insulating effect is enhanced.

Furthermore, the thermal insulation light guide element 130 of the embodiment further has an upper surface 136 and a sink portion 138. The upper surface 136 connects the light incident surface 132 and the light emitting surface 134. As shown in FIG. 1A, the light beam 112 is emitted out of the light guide plate 120 through the first surface 122 and a direction which the upper surface 136 faces to is substantially the same as a direction along which the light beam 112 is emitted from the first surface 122. The sink portion 138 is disposed on the upper surface 136 and adjacent to the light guide plate 120. The sink portion 138 is able to carry a display panel 140. The display panel 140 may be leaned on the sink portion 138 through a bottom gasket 150b. In the embodiment, the display panel 140 is, for example, a liquid crystal display (LCD) panel. Besides, the thermal insulation light guide element 130 having the sink portion 138 is able to carry the display panel 140 to take place of the function of frame in the conventional art.

On the other hand, as shown in FIG. 1A, in the embodiment, a front frame 170 is further disposed on the thermal insulation light guide element 130 and a back frame 160. The front frame 170 may be leaned on the display panel 140 through an upper gasket 150a. In other words, the front frame 170 and the thermal insulation light guide element 130 are able to clamp the display panel 140 respectively via the upper gasket 150a and the bottom gasket 150b. In another embodiment, the upper gasket 150a and the bottom gasket 150b may be replaced by an adhesive compound. In the embodiment, the back frame 160 has a carrier 162 and a supporting portion 164. The light guide plate 120 is disposed on the carrier 162, and the light emitting device 110 is disposed between the supporting portion 164 and the thermal insulation light guide element 130. Besides, as shown in FIG. 1A and FIG. 1B, the light emitting device 110 of the embodiment may be disposed on a circuit board 114, and the circuit board 114 may be disposed on the supporting portion 164 of the back frame 160.

Figure 2A:
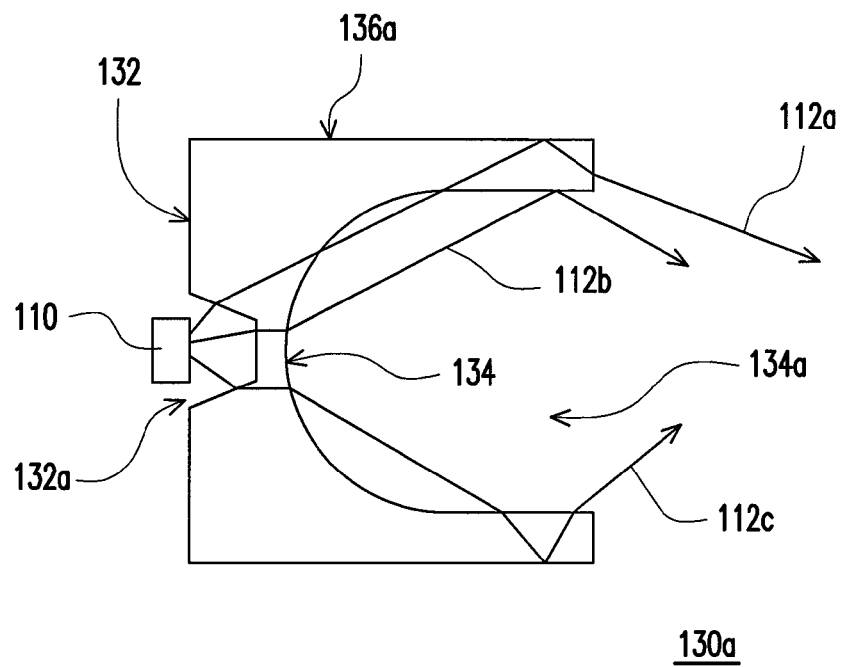
FIG. 2A to FIG. 2J are schematic cross-sectional views of thermal insulation light guide elements respectively in other embodiments.

The thermal insulation light guide element 130 may be designed as different shapes. Referring to FIG. 2A to FIG. 2J, the thermal insulation light guide element 130a of FIG. 2A is similar to the thermal insulation light guide element 130 of FIG. 1A, while the main difference between the thermal insulation light guide element 130a and the thermal insulation light guide element 130 lies in that the thermal insulation light guide element 130a may not have the sink portion 138 of the thermal insulation light guide element 130. In detail, an upper surface 136a of the thermal insulation light guide element 130a is a flat surface.

As shown in FIG. 2A, the light emitting device 110 partially disposed in the first recess 132a is capable of emitting light beams 112a-112c. The light beam 112a enters the thermal insulation light guide element 130a through the light incident surface 132. When an incident angle of the light beam 112a transmitted to the upper surface 136a is greater than a critical angle, the light beam 112a is totally reflected by the upper surface 136a and then is emitted from the light emitting surface 134. Hence, the recess structure in FIG. 2A is capable of enlarging a light emitting angle of light with a large angle (e.g. 70 degree) of the light beam 112, so that non-uniform brightness at the light incident side of the light guide plate 120 is reduced. Furthermore, the recess structure mentioned above is capable of effectively converging a part of the light beam 112 towards the light guide plate 120, such that efficiency of light is enhanced.

On the other hand, when the light beam 112b emitted from the light emitting surface 134 is transmitted to the light emitting surface 134 again, a part of the light beam 112b is reflected by the light emitting surface 134 and a deflection angle of the light beam 112b is towards the light guide plate 120 (shown in FIG. 1A). Besides, as shown in FIG. 2A, after the light beam 112c passes through the thermal insulation light guide element 130a, the deflection direction of the light beam 112c is towards the light guide plate 120 (shown in FIG. 1A) as well.

Figure 2B:
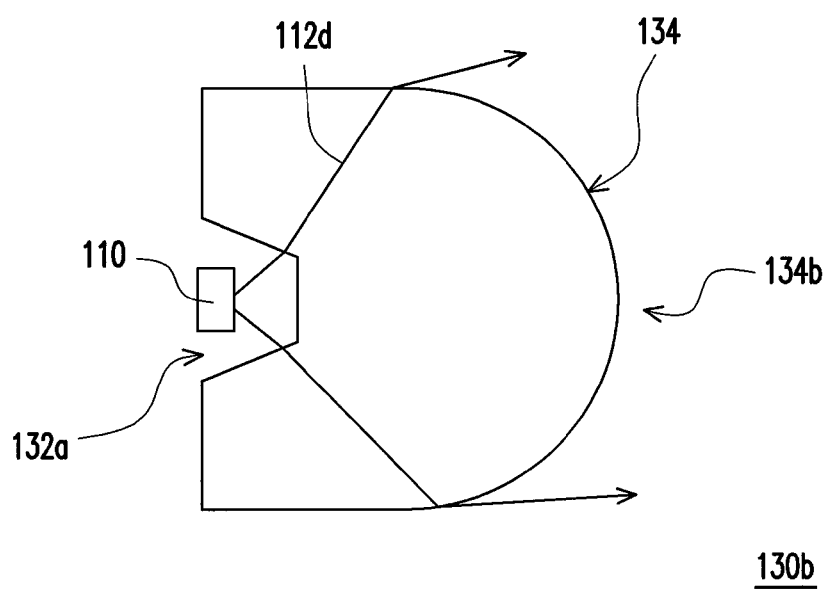

As shown in FIG. 2B, the thermal insulation light guide element 130b is similar to the thermal insulation light guide element 130a, while the main difference between the thermal insulation light guide element 130b and the thermal insulation light guide element 130a lies in that the light emitting surface 134 of the thermal insulation light guide element 130b includes at least one protrusion 134b and the protrusion 134b forms a curved convex. On the other hand, the light emitting device 110 is disposed in the first recess 132a. In another embodiment, the light emitting device 110 may be partially disposed in the first recess 132a. As shown in FIG. 2B, after the light beam 112d passes through the thermal insulation light guide element 130b, the deflection direction of the light beam 112d is towards the light guide plate 120 (shown in FIG. 1A) as well. Hence, the thermal insulation light guide element 130b in FIG. 2B is capable of effectively gathering the light beam 112d towards the light guide plate 120 (shown in FIG. 1A), such that the efficiency of light is enhanced by about 2%.

Figure 2C:
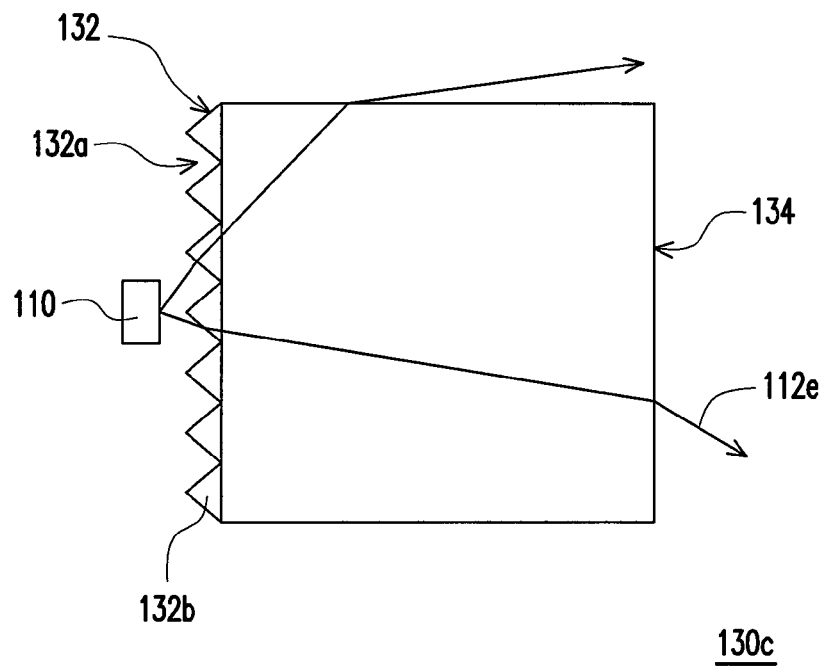

As shown in FIG. 2C, the light incident surface 132 of the thermal insulation light guide element 130c includes a plurality of first recesses 132a. And the thermal insulation light guide element 130c further has a plurality of prism structures 132b, wherein the prism structures 132b are disposed on the light incident surface 132 to form a plurality of first recesses 132a. On the other hand, the light emitting surface 134 of the thermal insulation light guide element 130c is a flat surface. The above-mentioned structure of the light emitting surface 134 is capable of increasing a divergent angle of the light beam 112e such that uneven brightness of the light guide plate 120 at the light incident side is reduced, i.e. hot spots are prevented. Besides, the efficiency of light is enhanced by about 2%.

Figure 2D:
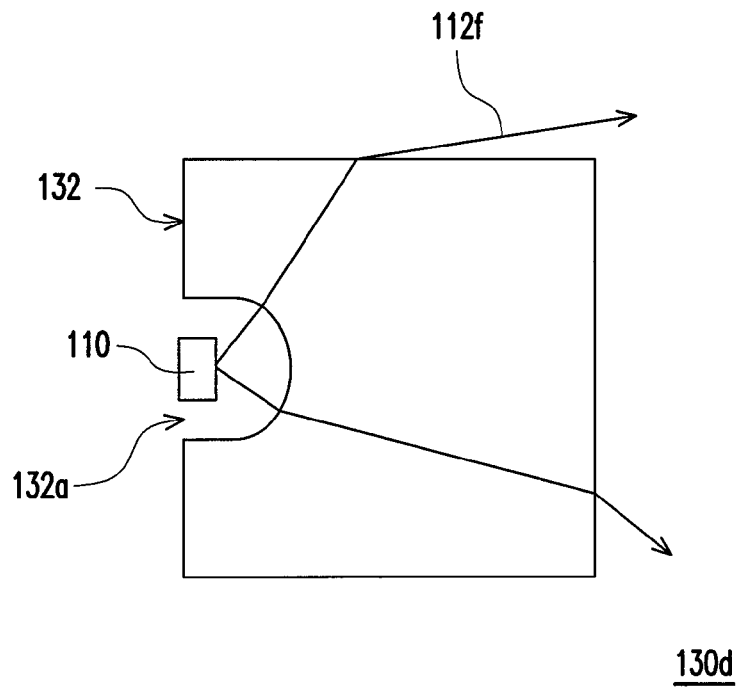

As shown in FIG. 2D, the thermal insulation light guide element 130d is similar to the thermal insulation light guide element 130c, while the main difference between the thermal insulation light guide element 130d and the thermal insulation light guide element 130c lies in that the first recess 132a of the thermal insulation light guide element 130d forms a curved concave. In addition, the light emitting device 110 is disposed in the first recess 132a. In another embodiment, the light emitting device 110 may be partially located in the first recess 132a. Similar to FIG. 2C, the structure of the first recess 132a is capable of increasing a divergent angle of the light beam 112f such that the uneven brightness of the light guide plate 120 at the light incident side is reduced. Besides, the efficiency of light is enhanced by about 2%.

Figure 2E:
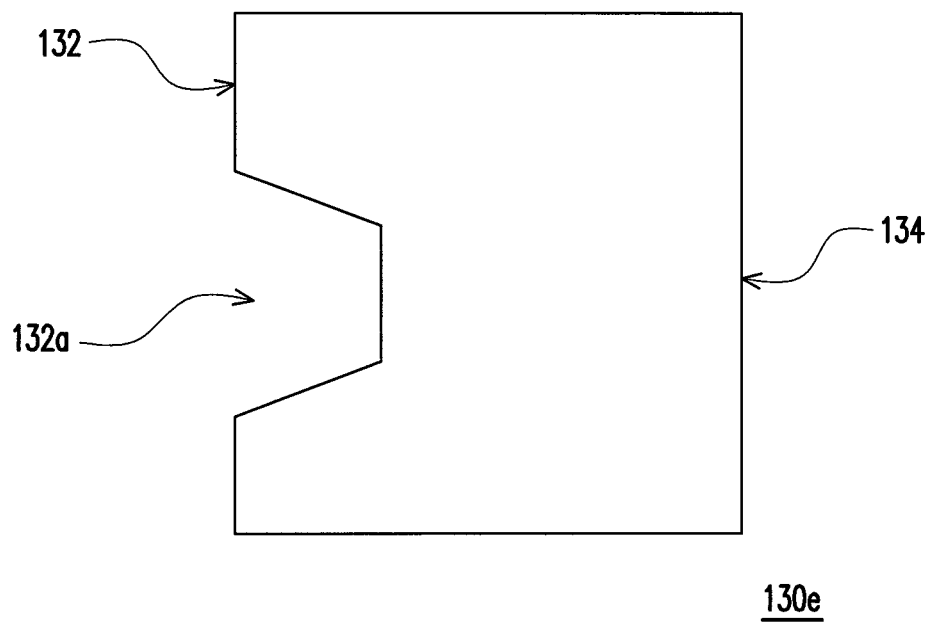
Figure 2F:
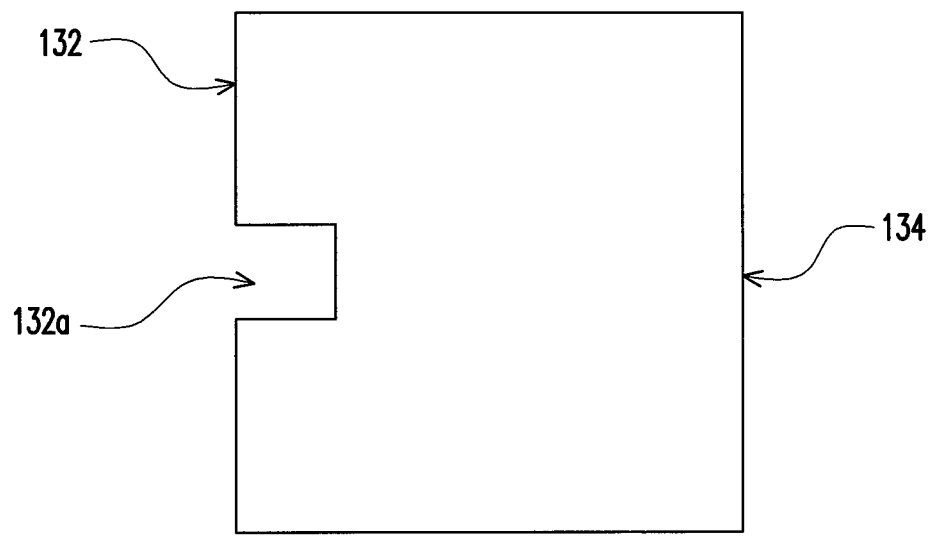
Figure 2G:
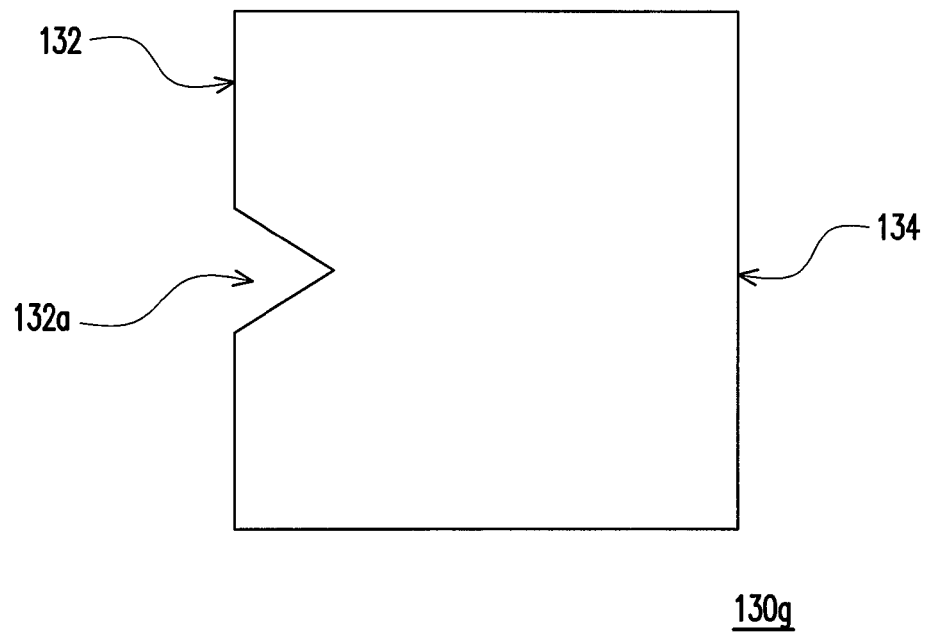

The thermal insulation light guide element 130e of FIG. 2E is similar to the thermal insulation light guide element 130d of FIG. 2D, while the main difference between the thermal insulation light guide element 130e and the thermal insulation light guide element 130d lies in that the first recess 132a of the thermal insulation light guide element 130e is a polygonal recess, and a cross-sectional view of the first recess 132a is a trapezoid. On the other hand, the thermal insulation light guide element 130f of FIG. 2F is similar to the thermal insulation light guide element 130e of FIG. 2E, while the main difference between the thermal insulation light guide element 130f and the thermal insulation light guide element 130e lies in that a cross-sectional view of the first recess 132a of the thermal insulation light guide element 130f is a rectangle. Besides, the thermal insulation light guide element 130g of FIG. 2G is similar to the thermal insulation light guide element 130e of FIG. 2E as well, while the while the main difference between the thermal insulation light guide element 130g and the thermal insulation light guide element 130e lies in that a cross-sectional view of the first recess 132a of the thermal insulation light guide element 130g is a triangle.

Figure 2H:
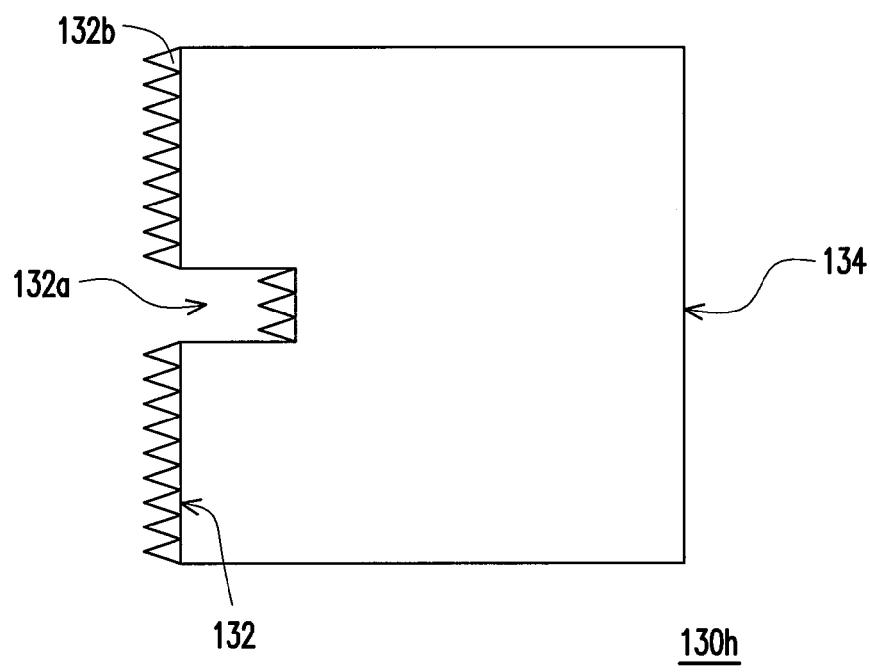

Then, referring to FIG. 2H, the thermal insulation light guide element 130h of FIG. 2H is similar to the thermal insulation light guide element 130f of FIG. 2F, while the main difference between the thermal insulation light guide element 130h and the thermal insulation light guide element 130f lies in that the thermal insulation light guide element 130h further has a plurality of prism structures 132b. Parts of the prism structures 132b are disposed in the first recess 132a and the other parts of the prism structures 132b are disposed outside the first recess 132a of the light incident surface 132.

Figure 2I:
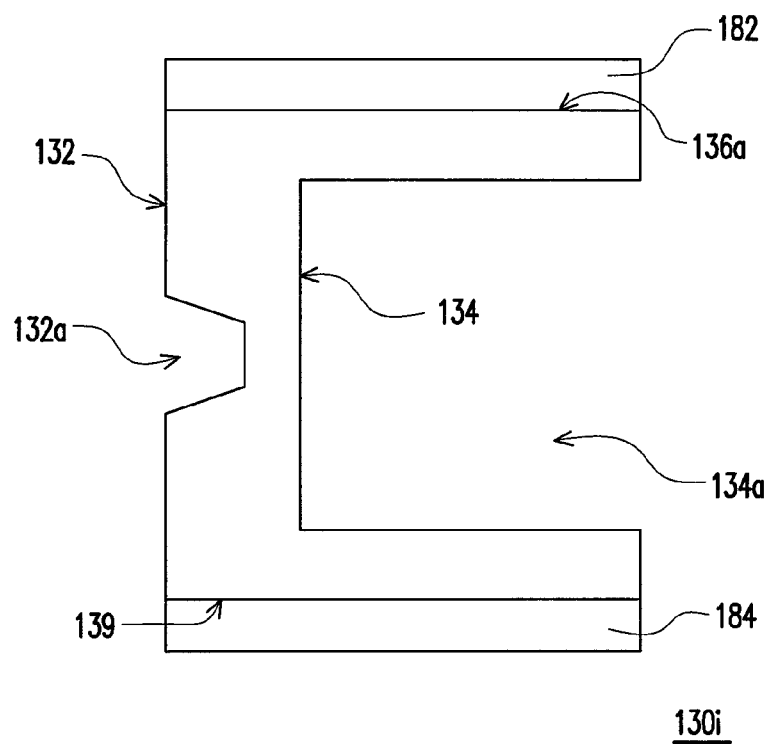

Furthermore, a thermal insulation light guide element 130i of FIG. 2I is similar to the thermal insulation light guide element 130a of FIG. 2A, while the main difference between the thermal insulation light guide element 130i and the thermal insulation light guide element 130a lies in that the second recess 134a of the thermal insulation light guide element 130i is a polygonal recess, and a cross-sectional view of the second recess 134a is a rectangle. Besides, the thermal insulation light guide element 130i further has the upper surface 136a and a bottom surface 139. The bottom surface 139 is opposite to the upper surface 136a and connects the light incident surface 132 and the light emitting surface 134. Moreover, the backlight module 100 of the embodiment further includes two reflective films 182 and 184. The reflective films 182 and 184 are respectively disposed on the upper surface 136a and the bottom surface 139 of the thermal insulation light guide element 130i, such that most part of a light beam, e.g. the light beam 112a (shown in FIG. 2A) is emitted from the light emitting surface 134. In another embodiment, the backlight module may not include the reflective films 182 and 184.

Figure 2J:
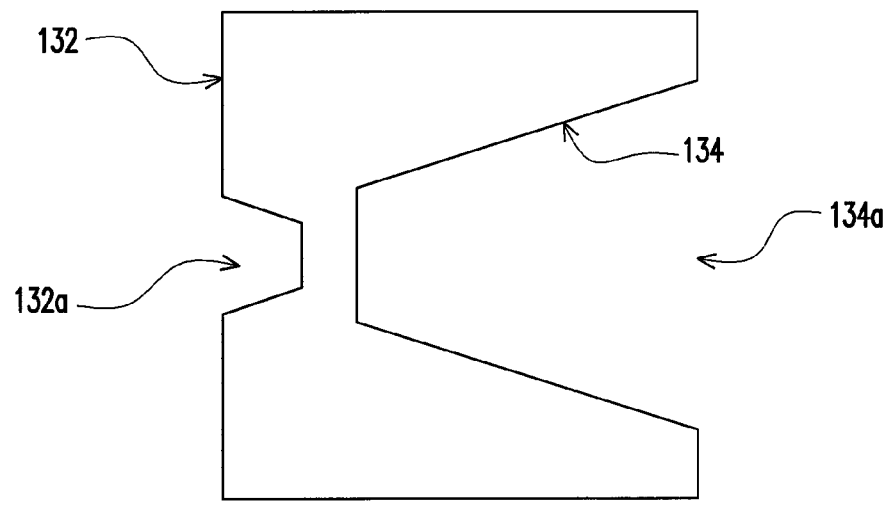

Then, referring to FIG. 2J, a thermal insulation light guide element 130j is similar to the thermal insulation light guide element 130i of FIG. 2I, while the main difference between the thermal insulation light guide element 130j and the thermal insulation light guide element 130i lies in that a cross-sectional view of the second recess 134a of the thermal insulation light guide element 130j is a trapezoid. Moreover, the backlight module 100 of the invention may not include two reflective films 182 and 184 of FIG. 2I.

In the following embodiments and figures, identical or similar reference numbers stand for identical or similar elements for the sake of simple illustration.

Second Embodiment

Figure 3A:
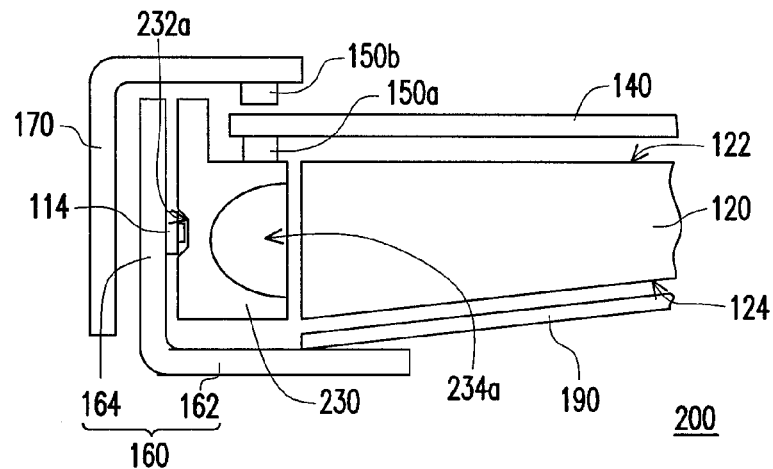
FIG. 3A is a schematic cross-sectional view of a backlight module, a front frame disposed on the backlight module, and a display panel in the second embodiment of the invention.
Figure 3B:
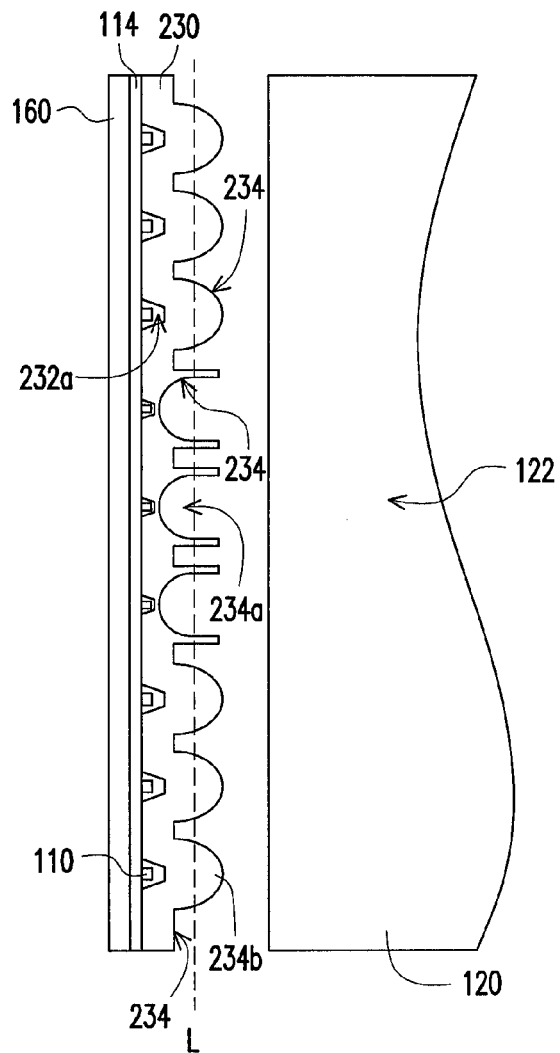
FIG. 3B is a schematic top view of the backlight module in FIG. 3A.

Referring to both FIG. 3A and FIG. 3B, the backlight module 200 includes at least one light emitting device 110 (nine light emitting devices 110 are schematically shown in FIG. 3B), a light guide plate 120, and a thermal insulation light guide element 230. The backlight module 200 of the embodiment is similar to the backlight module 100 of the first embodiment, while the main difference between the backlight module 200 and the backlight module 100 lies in that a light emitting surface 234 of the thermal insulation light guide element 230 includes a plurality of second recesses 234a and a plurality of protrusions 234b. The second recesses 234a and the protrusions 234b are aligned along a reference straight line L. Furthermore, the second recesses 234a are disposed on a central region of the light emitting surface 234 and the protrusions 234b are disposed on two sides of the light emitting surface 234.

On the other hand, as shown in FIG. 3A and FIG. 3B, a light incident surface of the thermal insulation light guide element 230 includes a plurality of first recesses 232a. The light emitting device 110 is disposed in the first recesses 232a respectively and disposed on the circuit board 114. In detail, the thermal insulation light guide element 230 of the embodiment is a combination of the thermal insulation light guide element 130a in FIG. 2A and the thermal insulation light guide element 130b in FIG. 2B. Hence, the second recesses 234a disposed on the central region of the light emitting surface 234 are capable of increasing a divergent angle of the light beam (as shown in FIG. 2A) such that the uneven brightness of the light guide plate 120 at the light incident side is reduced, and the protrusions 234b disposed on two sides of the light emitting surface 234 are capable of converging the divergent angle of the light beam (as shown in FIG. 2B).

Table 1 is a Cx coordinate in a CIE 1931 (International commission on illumination 1931) chromaticity diagram corresponding to a position of the light guide plate 120 of a backlight module without the thermal insulation light guide element 230.

TABLE 1

| | x | | | |
|---|---|---|---|---|
| y | 1 | 2 | 3 | 4 |
| 1 | 0.2928 | 0.2913 | 0.2906 | 0.2906 |
| 2 | 0.2929 | 0.2929 | 0.2928 | 0.2926 |
| 3 | 0.2939 | 0.2934 | 0.2932 | 0.293 |
| 4 | 0.2946 | 0.294 | 0.2936 | 0.2937 |
| 5 | 0.2947 | 0.2942 | 0.2945 | 0.2947 |
| 6 | 0.296 | 0.2949 | 0.2955 | 0.2957 |
| 7 | 0.2941 | 0.2944 | 0.2955 | 0.2959 |
| 8 | 0.2938 | 0.296 | 0.2961 | 0.2959 |
| 9 | 0.2949 | 0.2962 | 0.2969 | 0.2959 |
| 10 | 0.2944 | 0.2955 | 0.2961 | 0.2956 |
| 11 | 0.2953 | 0.2989 | 0.2981 | 0.2961 |

The light guide plate 120 corresponding to Table 1 is divided into 4×11 regions, and the light emitting device 110 is disposed at a side of Table 1, wherein the y coordinate equals to 11 in the side of Table 1. That is, when the y coordinate becomes smaller, the corresponding position gets farther from the light emitting device 110. After calculating the data shown in Table 1, the average shift of the Cx coordinate is about 0.01. Hence, color non-uniformity occurs when the backlight module may not have the thermal insulation light guide element 230.

Table 2 is a Cx coordinate in the CIE 1931 chromaticity diagram corresponding to a position of the light guide plate 120 of the backlight module 200. Herein the backlight module 200 includes the thermal insulation light guide element 230, and the thermal insulation light guide element 230 is disposed between the light emitting device 110 and the light guide plate 120.

TABLE 2

| y | x=1 | x=2 | x=3 | x=4 |
|---|---|---|---|---|
| 1 | 0.296 | 0.2977 | 0.2954 | 0.2955 |
| 2 | 0.2958 | 0.2959 | 0.2948 | 0.2956 |
| 3 | 0.295 | 0.2965 | 0.2956 | 0.2964 |
| 4 | 0.2958 | 0.2961 | 0.2954 | 0.2958 |
| 5 | 0.296 | 0.2964 | 0.2954 | 0.296 |
| 6 | 0.296 | 0.2961 | 0.2957 | 0.2963 |
| 7 | 0.2961 | 0.2962 | 0.2963 | 0.296 |
| 8 | 0.2952 | 0.2948 | 0.2961 | 0.2948 |
| 9 | 0.296 | 0.2955 | 0.2958 | 0.2954 |
| 10 | 0.2947 | 0.2947 | 0.2949 | 0.2946 |
| 11 | 0.2937 | 0.2937 | 0.2943 | 0.2935 |

As shown in Table 2, Cx coordinates corresponding to positions having the same y coordinates and different x coordinates are similar. After calculating the data shown in Table 2, after the thermal insulation light guide element 230 is disposed, the average shift of the Cx coordinate is reduced from original 0.01 to 0.003. Thus, the backlight module 200 of the embodiment is capable of providing a surface light source with uniform color. In addition, the average brightness of the surface light source is enhanced about by 2%.

Table 3 is temperature corresponding to different positions of the light guide plate 120 of a backlight module without the thermal insulation light guide element 230.

TABLE 3

| y | x=1 | x=2 | x=3 | x=4 | x=5 |
|---|---|---|---|---|---|
| 1 |  |  |  |  |  |
| 2 |  |  |  |  |  |
| 3 |  |  |  |  |  |
| 4 |  |  | 30° C. |  |  |
| 5 |  |  |  |  |  |
| 6 |  |  |  |  |  |
| 7 |  | 69° C. | 70° C. | 69° C. |  |

The light guide plate 120 corresponding to Table 3 is divided into 5×7 regions, and the light emitting device 110 is disposed on a side of Table 3, wherein the y coordinate equals to 7 in the side of Table 3. That is, when the y coordinate becomes greater, the corresponding position gets closer to the light emitting device 110. As shown in Table 3, in the backlight module the temperature corresponding to the central region of the light guide plate 120 is lower than the temperature corresponding to the edge of the light guide plate 120 near the light emitting device 110, and the temperature difference between the central region and the edge is great. Thus, a warp in the light guide plate 120 occurs easily due to being unevenly heating, such that the optical efficiency and the reliability of the backlight module are decreased. Table 4 is temperature corresponding to different positions of the light guide plate 120 of the backlight module 200 in the embodiment. Herein the backlight module 200 includes the thermal insulation light guide element 230. The thermal insulation light guide element 230 is disposed between the light emitting device 110 and the light guide plate 120.

TABLE 4

| y | x=1 | x=2 | x=3 | x=4 | x=5 |
|---|---|---|---|---|---|
| 1 |  |  |  |  |  |
| 2 |  |  |  |  |  |
| 3 |  |  |  |  |  |
| 4 |  |  | 30° C. |  |  |
| 5 |  |  |  |  |  |
| 6 |  |  |  |  |  |
| 7 | 52° C. | 51° C. | 52° C. | 51° C. | 52° C. |
| 8 | 52° C. |  | 52° C. | 51° C. |  |
| 9 | 69° C. |  | 70° C. | 69° C. | 68° C. |

The light guide plate 120 corresponding to Table 4 the same as Table 3 is divided into 5×7 regions. The thermal insulation light guide element 230 is divided into 5×2 regions and the corresponding y coordinates of the thermal insulation light guide element 230 equals to 8 and 9. Besides, the light emitting device 110 is disposed on a side of Table 4, wherein the y coordinate equals to 9 in the side of Table 4. In other words, the thermal insulation light guide element 230 is further disposed between the light emitting device 110 and the light guide plate 120. From Table 4, in the backlight module 200 of the embodiment, since the thermal insulation light guide element 230 is capable of insulating against heat from the light emitting device 110, the temperature at the edge of the light guide plate 120 near the light emitting device 110 is decreased by 16° C. Thus, the warp in the light guide plate 120 due to being unevenly heated is prevented and the reliability of the backlight module 200 is enhanced.

Third Embodiment

Figure 4A:
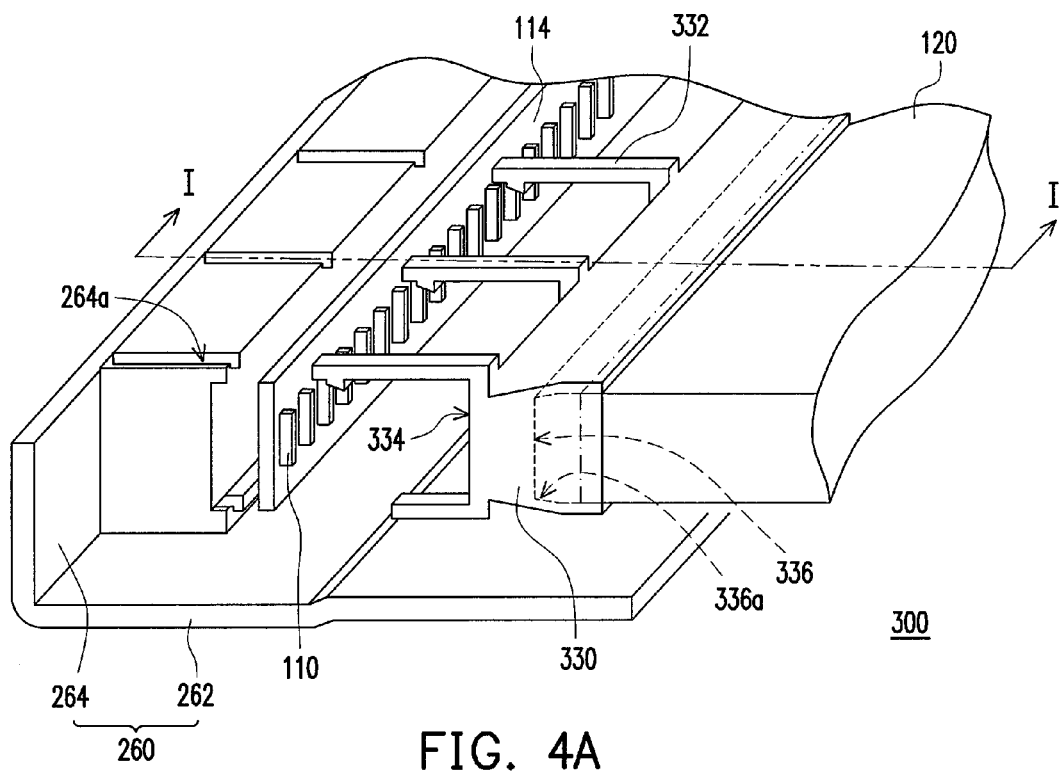
FIG. 4A is a schematic three dimensional view of a backlight module in the third embodiment of the invention.
Figure 4B:
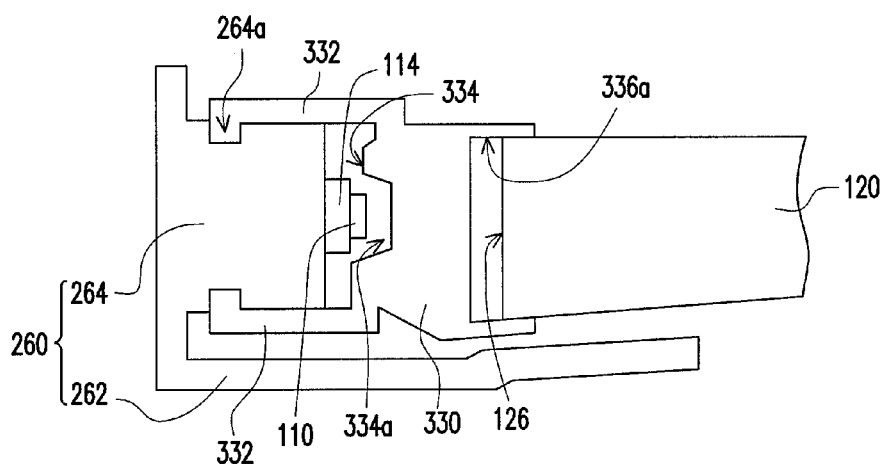
FIG. 4B is a schematic cross-sectional view taken along a line I-I in FIG. 4A.

Referring to both FIG. 4A and FIG. 4B, the backlight module 300 of the embodiment is similar to the backlight module 100 of the first embodiment, while the main difference between the backlight module 300 and the backlight module 100 lies in that a supporting portion 264 of the backlight module 300 has at least one first lock portion 264a and a thermal insulation light guide element 330 has at least one second lock portion 332. The first lock portion 264a and the second lock portion 332 are locked with each other, and the light emitting device 110 is disposed between the supporting portion 264 and the thermal insulation light guide element 330.

In the embodiment, the first lock portion 264a is a trench and the second lock portion 332 is a hook. The hook is wedged into the corresponding trench for hooking the supporting portion 264 of a back frame 260. Hence, the thermal insulation light guide element 330 is able to be directly wedged into the back frame 260 without through fixing holes and screws on the circuit board 114, such that the area on the circuit board 114 for disposing the light emitting device 110 is increased by about 30% in the embodiment. In another embodiment, the first lock portion 264a may be a hook and the second lock portion 332 may be a trench. The hook is wedged into the corresponding trench for hooking the thermal insulation light guide element 330 to the supporting portion 264 of the back frame 260.

Referring to both FIG. 4A and FIG. 4B, the backlight module 300 includes a plurality of light emitting devices 110, a light guide plate 120, and a thermal insulation light guide element 330. As shown in FIG. 4, a light incident surface 334 of the thermal insulation light guide element 330 has a plurality of first recesses 334a. The first recess 334a is a polygonal recess. At least one part of each of the light emitting devices 110 is disposed in the corresponding first recess 334a. Besides, a light emitting surface 336 of the thermal insulation light guide element 330 has a second recess 336a. The second recess 336a is a polygonal recess. Furthermore, the side surface 126 of the light guide plate 120 is disposed in the second recess 336a. In other words, part of the light guide plate 120 is embedded in the second recess 336a.

In summary, in the backlight module of the embodiment of the invention, the thermal insulation light guide element having a higher glass transition temperature than the light guide plate is disposed between the light emitting device and the light guide plate. Hence, the heat is insulated against being transmitted from the light emitting device to the light guide plate, such that the warp in the light guide plate due to being unevenly heated is prevented. As such, the reliability of the backlight module is enhanced. Besides, a specially designed light incident surface or light emitting surface of the thermal insulation light guide element is capable of changing the light emission distribution. Thus, the backlight module of the embodiment is capable of providing a surface light source with uniform brightness and color. Furthermore, because of the back frame and the thermal insulation light guide element having the lock structures, the reduction of space available on the circuit board for disposing the light emitting device due to the space occupied by the screw hole is prevented. Hence, the space of the circuit board for disposing the light emitting device is increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module comprising:
   at least one light emitting device capable of emitting a light beam;
   a light guide plate having a first surface, a second surface opposite to the first surface, and a side surface connecting the first surface and the second surface, wherein the light emitting device is disposed beside the side surface, and the light beam is capable of entering the light guide plate through the side surface; and
   a thermal insulation light guide element having:
   a light incident surface located in a transmission path of the light beam and between the light emitting device and the side surface, wherein the light incident surface has at least one first recess; and
   a light emitting surface located in the transmission path of the light beam and between the light incident surface and the side surface, wherein a glass transition temperature of the thermal insulation light guide element is higher than a glass transition temperature of the light guide plate, wherein the light emitting surface of the thermal insulation light guide element comprises a plurality of second recesses and a plurality of protrusions, the second recesses and the protrusions are aligned along a reference straight line, the second recesses are disposed on a central region of the light emitting surface, and the protrusions are disposed on two sides of the light emitting surface, wherein an extension direction of the reference straight line is perpendicular to a direction of the light beam emitted from the first surface of the light guide plate.

2. The backlight module of claim 1, wherein the first recess comprises a polygonal recess.

3. The backlight module of claim 1, wherein the first recess forms a curved concave.

4. The backlight module of claim 1, wherein the at least one first recess is a plurality of first recesses, and the thermal insulation light guide element further has a plurality of prism structures disposed on the light incident surface to form the first recesses.

5. The backlight module of claim 1, wherein the thermal insulation light guide element further has a plurality of prism structures, and parts of the prism structures are disposed in the first recess, and another parts of the prism structures are disposed on the light incident surface outside the first recess.

6. The backlight module of claim 1, wherein at least one part of the light emitting device is located in the first recess.

7. The backlight module of claim 1, wherein the light emitting surface of the thermal insulation light guide element has at least one second recess.

8. The backlight module of claim 7, wherein the side surface of the light guide plate is located in the second recess.

9. The backlight module of claim 7, wherein the second recess comprises a polygonal recess or forms a curved concave.

10. The backlight module of claim 1, wherein the light emitting surface of the thermal insulation light guide element has at least one protrusion.

11. The backlight module of claim 10, wherein the protrusion forms a curved convex.

12. The backlight module of claim 1, wherein the thermal insulation light guide element further has:
   an upper surface connecting the light incident surface and the light emitting surface, wherein the light beam is capable of being emitted out of the light guide plate through the first surface, and a direction the upper surface faces to is substantially the same as a direction along which the light beam is emitted from the first surface; and a bottom surface opposite to the upper surface and connecting the light incident surface and the light emitting surface, wherein the backlight module further comprises two reflective films respectively disposed on the upper surface and the bottom surface of the thermal insulation light guide element.

13. The backlight module of claim 1, further comprising:
a back frame having a carrier and a supporting portion, wherein the light guide plate is disposed on the carrier, the supporting portion has at least one first lock portion, the thermal insulation light guide element has at least one second lock portion, the first lock portion and the second lock portion are locked with each other, and the light emitting device is located between the supporting portion and the thermal insulation light guide element.

14. A backlight module comprising:
at least one light emitting device capable of emitting a light beam;
a light guide plate having a first surface, a second surface opposite to the first surface, and a side surface connecting the first surface and the second surface, wherein the light emitting device is disposed beside the side surface, and the light beam is capable of entering the light guide plate through the side surface; and
a thermal insulation light guide element having:
  a light incident surface located in a transmission path of the light beam and between the light emitting device and the side surface; and
  a light emitting surface located in the transmission path of the light beam and between the light incident surface and the side surface, wherein the light emitting surface has a plurality of recesses and a plurality of protrusions, and a glass transition temperature of the thermal insulation light guide element is higher than a glass transition temperature of the light guide plate, wherein the recesses and the protrusions are aligned along a reference straight line, the recesses are disposed on a central region of the light emitting surface, and the protrusions are disposed on two sides of the light emitting surface, wherein an extension direction of the reference straight line is perpendicular to a direction of the light beam emitted from the first surface of the light guide plate.

15. The backlight module of claim 14, wherein the recess comprises a polygonal recess or forms a curved concave.

16. The backlight module of claim 14, wherein the thermal insulation light guide element further has:
  an upper surface connecting the light incident surface and the light emitting surface, wherein the light beam is capable of being emitted out of the light guide plate through the first surface, and a direction the upper surface faces to is substantially the same as a direction along which the light beam is emitted from the first surface; and
  a bottom surface opposite to the upper surface and connecting the light incident surface and the light emitting surface, wherein the backlight module further comprises two reflective films respectively disposed on the upper surface and the bottom surface of the thermal insulation light guide element.

17. The backlight module of claim 14, wherein the protrusion forms a curved convex.

18. The backlight module of claim 1, wherein the thermal insulation light guide element further has:
  an upper surface connecting the light incident surface and the light emitting surface, wherein the light beam is capable of being emitted out of the light guide plate through the first surface, and a direction the upper surface faces to is substantially the same as a direction along which the light beam emitted from the first surface; and
  a sink portion disposed on the upper surface and adjacent to the light guide plate for carrying a display panel.

* * * * *